US008555366B2

(12) United States Patent
Joffray et al.

(10) Patent No.: US 8,555,366 B2
(45) Date of Patent: Oct. 8, 2013

(54) METHOD OF MANAGING COMMUNICATION BETWEEN AN ELECTRONIC TOKEN AND A REMOTE WEB SERVER

(75) Inventors: Olivier Joffray, Feucherolles (FR); Philippe Smadja, St Remy les Chevreuse (FR)

(73) Assignee: Gemalto SA, Meudon (FR)

( * ) Notice: Subject to any disclaimer, the term of this patent is extended or adjusted under 35 U.S.C. 154(b) by 803 days.

(21) Appl. No.: 12/602,662

(22) PCT Filed: May 27, 2008

(86) PCT No.: PCT/EP2008/056466
§ 371 (c)(1),
(2), (4) Date: May 28, 2010

(87) PCT Pub. No.: WO2008/148664
PCT Pub. Date: Dec. 11, 2008

(65) Prior Publication Data
US 2010/0257232 A1 Oct. 7, 2010

(30) Foreign Application Priority Data
Jun. 6, 2007 (EP) .................................... 07011126

(51) Int. Cl.
*G06F 15/173* (2006.01)
(52) U.S. Cl.
USPC ...................... 726/9; 709/225; 726/20; 726/8
(58) Field of Classification Search
USPC .................................. 709/225; 726/9, 20, 8
See application file for complete search history.

(56) References Cited

U.S. PATENT DOCUMENTS

| 7,340,773 | B2 * | 3/2008 | Edwards | 726/20 |
|---|---|---|---|---|
| 8,132,243 | B2 * | 3/2012 | Bychkov | 726/9 |
| 8,291,227 | B2 * | 10/2012 | Parkinson | 713/176 |
| 8,307,413 | B2 * | 11/2012 | Smadja et al. | 726/9 |
| 8,402,527 | B2 * | 3/2013 | Austin et al. | 726/9 |
| 8,434,137 | B2 * | 4/2013 | Lu | 726/9 |
| 2003/0120610 | A1 * | 6/2003 | Hamber | 705/67 |
| 2003/0149781 | A1 * | 8/2003 | Yared et al. | 709/229 |
| 2006/0294023 | A1 * | 12/2006 | Lu | 705/67 |
| 2010/0169962 | A1 * | 7/2010 | Lu | 726/9 |
| 2010/0235637 | A1 * | 9/2010 | Lu et al. | 713/168 |
| 2010/0325236 | A1 * | 12/2010 | Savinen et al. | 709/217 |
| 2012/0278614 | A1 * | 11/2012 | Choi | 713/159 |

* cited by examiner

*Primary Examiner* — Kevin Bates
(74) *Attorney, Agent, or Firm* — Buchanan Ingersoll & Rooney PC

(57) ABSTRACT

The invention is a method of managing communication between an electronic token and a remote web server. The token and the server are connected to a same host machine. The token comprises first and second token servers and a memory comprising HTML data. The host machine has an Internet web browser. Said method comprises the steps of:
sending a first request from the Internet web browser to the first token server,
returning a first answer to the Internet browser, said first answer comprising HTML data including a connection information associated to a script,
on the Internet web browser, executing the script associated to the connection information. Script execution establishes a connection to the remote server allowing a two-way communication between the second token server and the remote server through the Internet browser acting as a gateway.

12 Claims, 3 Drawing Sheets

METHOD OF MANAGING COMMUNICATION BETWEEN AN ELECTRONIC TOKEN AND A REMOTE WEB SERVER

FIELD OF THE INVENTION

The present invention relates to methods of managing communication between an electronic token and a remote server. It relates particularly to methods of managing communication between an electronic token comprising a server and a remote web server.

PRIOR ART

Electronic tokens are portable electronic objects like smart cards, portable audio devices, mobile handsets, personal digital assistants or USB tokens. The word "Internet" means "interconnected networks". Electronic tokens may embed a local network comprising a hypertext transfer protocol HTTP server, a local Domain name system DNS server, or a dynamic host configuration protocol DHCP server. Alternatively, the local network can be a combination of these servers. The local network may comprise a unique or several local servers combining the functions of a HTTP and/or DNS and/or DHCP and/or the function of any server or service according to the World Wide Web consortium rules (W3C), said servers having a unique IP address.

An electronic token may be connected to a host machine. A host machine may be connected to a remote server through Internet. A remote server is a distant server placed on a machine reachable through Internet. When both a remote server and an electronic token are connected to the same host machine, the remote server and the electronic token may communicate through the host machine. Existing host machines connected to Internet have an Internet web browser like Microsoft Internet Explorer® or Mozilla Firefox®.

At present for establishing a communication between an electronic token and a remote server the host machine must be customized using the Internet connection sharing mechanism or by installing dedicated software ensuring the same function. However customization of a host machine may be limited or forbidden by administration rights.

SUMMARY OF THE INVENTION

The invention aims at allowing communication between an electronic token and a remote server through a host machine without customization of said host machine. The invention aims at allowing the communication connection and the automatic routing of data between the electronic token and the remote server in both directions.

The object of the present invention is a method of managing communication between an electronic token and a remote web server. The electronic token is connected to a host machine and comprises a microprocessor, a communication interface and a memory. Said memory comprises an operating system and at least a first HTML data. Said electronic token comprises at least first and second token servers. The remote web server is connected to the same host machine. The host machine has an Internet web browser. Said method comprises the steps of:
sending a first request from the Internet web browser to the first token server,
returning a first answer from the first token server to the Internet web browser, said first answer comprising a first HTML data, said first HTML data comprising connection information associated to a script,
on the Internet web browser, executing the script associated to the connection information,
characterized in that execution of said script establishes a connection to the remote web server allowing a two-way communication between the second token server and the remote web server through the Internet web browser acting as a gateway.

The first HTML data may comprise second data and said method may comprise the further steps of:
sending a second request from the Internet web browser to the remote web server, wherein said second request comprises the second data,
on the remote web server, computing a specific URL based on the second data, said specific URL allowing connecting to the second token server,
returning a second answer from the remote web server to the Internet web browser, said second answer including a third data comprising the specific URL,
on the Internet web browser, routing said second answer received from the remote web server with a third request to the second token server.

The step of returning the second answer may be performed by a HTTP redirect function or by an HTML automatic submission function.

The electronic token may comprise a virtual local network comprising a local domain name server. The method may comprise the further steps of:
sending a DNS request from the Internet web browser to the local domain name system DNS server, said DNS request comprising the specific URL,
receiving a DNS answer comprising an IP address corresponding to the specific URL sent to the Internet web browser by the local domain name system DNS server.

The second answer may comprise a fourth data and the third request may comprise the fourth data.

The method may comprise the further steps of:
in response to the third request, sending a third answer from the second token server to the Internet web browser, said third answer comprising a fifth data,
routing said fifth data from the Internet web browser to the remote web server.

The second data may comprise a variable part which may be randomly set or computed according to a predefined sequence.

Each of said first and second token servers may be a HTTP server or a HTTPS server.

Said first and second token servers may be merged in a unique token server.

The connection information may comprise the script, or a script URL from where the script may be downloaded.

The script may be a javascript.

Another object of the invention is an electronic token which is intended to be connected to a host machine. The token contains a microprocessor, a communication interface and a memory. The memory comprises an operating system and at least a first HTML data. The token contains at least first and second token servers. The host machine has an Internet web browser and is connected a remote web server. The token is characterized in that the first HTML data comprises connection information associated to a script, said connection information being intended to be sent by the first token server. Execution of said script by the Internet web browser of the host machine establishes a connection to the remote web server allowing a two-way communication between the second token server and the remote web server through the Internet web browser acting as a gateway.

The token may be a smart card, a portable audio device, a mobile handset, a personal digital assistant or a USB token.

BRIEF DESCRIPTION OF THE DRAWINGS

Other characteristics and advantages of the present invention will emerge more clearly from a reading of the following description of a number of preferred embodiments of the invention with reference to the corresponding accompanying drawings in which.

DETAILED DESCRIPTION OF THE PREFERRED EMBODIMENTS

The invention may apply to any types of electronic token connected to a host machine. In this specification, the electronic token is a smart card but it could be any other kind of electronic token or portable device embedding a server.

An advantage of the invention is to allow an automatic treatment of data exchanged between an electronic token and a remote web server thanks to a gateway managed by the Internet web browser of a connected host machine.

Figure 1:
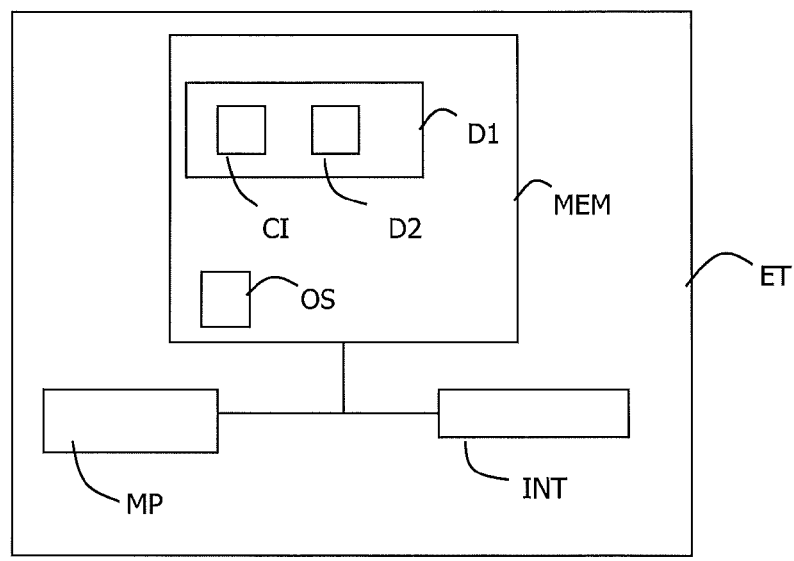
FIG. 1 depicts schematically the architecture of an electronic token of smart card type according to the invention.

FIG. 1 shows the architecture of a smart card as an example of an electronic token according to a preferred embodiment of the invention. The smart card ET contains a microprocessor MP, a communication interface INT and a memory MEM. The memory MEM contains an operating system OS and a first HTML data D1. The first HTML data D1 may corresponds to an HTML page content. The first HTML data D1 contains a connection information CI and a second data D2. The memory MEM may consist of a unique circuit or several circuits that may be of different types.

Figure 2:
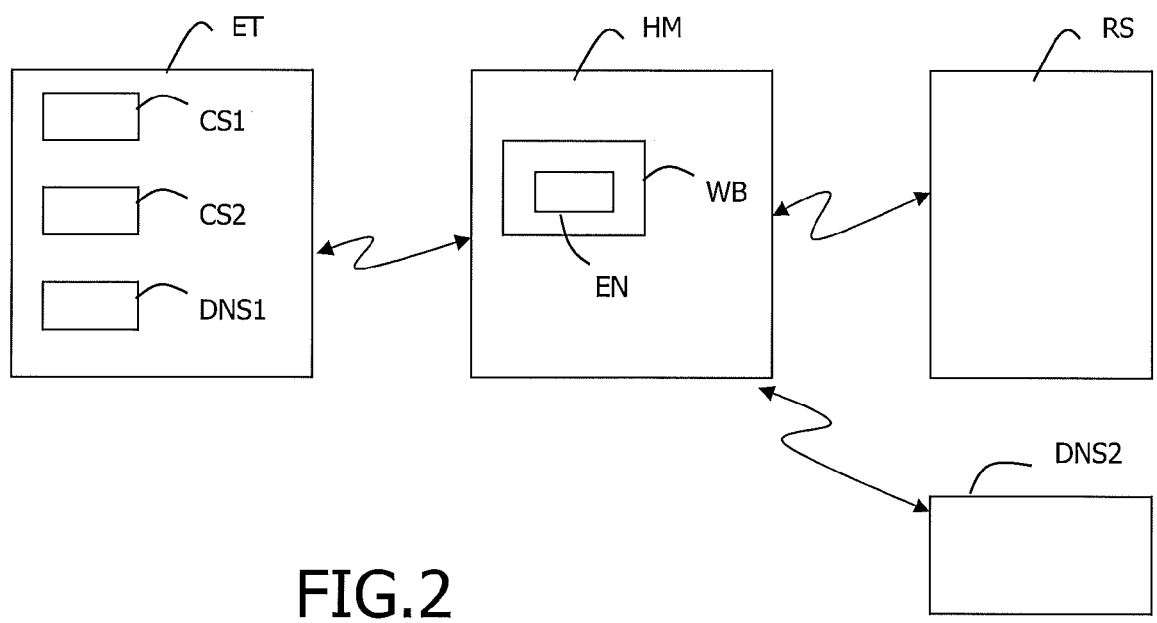
FIG. 2 depicts schematically the interaction between an electronic token, a host machine and a remote web server, according to the invention.

As shown in FIG. 2, the smart card ET contains a first server CS1, a second server CS2 and a local domain name system DNS server DNS1. A host machine HM contains an Internet web browser WB. The Internet web browser WB has a script engine EN. A script engine is able to execute a script. In the below part of this document, when a script is executed by the Internet web browser WB, the script is executed by the script engine of the Internet web browser WB.

The smart card ET is connected to the host machine HM such as a personal computer by a card reader or a dedicated interface. The electronic token may be connected to the host machine by a contact link or a wireless link.

A remote web server RS is connected to the host machine HM by Internet only or by a combination of several communication channels like Internet and an Over The Air (OTA) Telecom communication. A second domain name system DNS server DNS2 may be available on the Internet. DNS2 may returns IP address of server related names such as "***.MyCompany.com".

Figure 3:
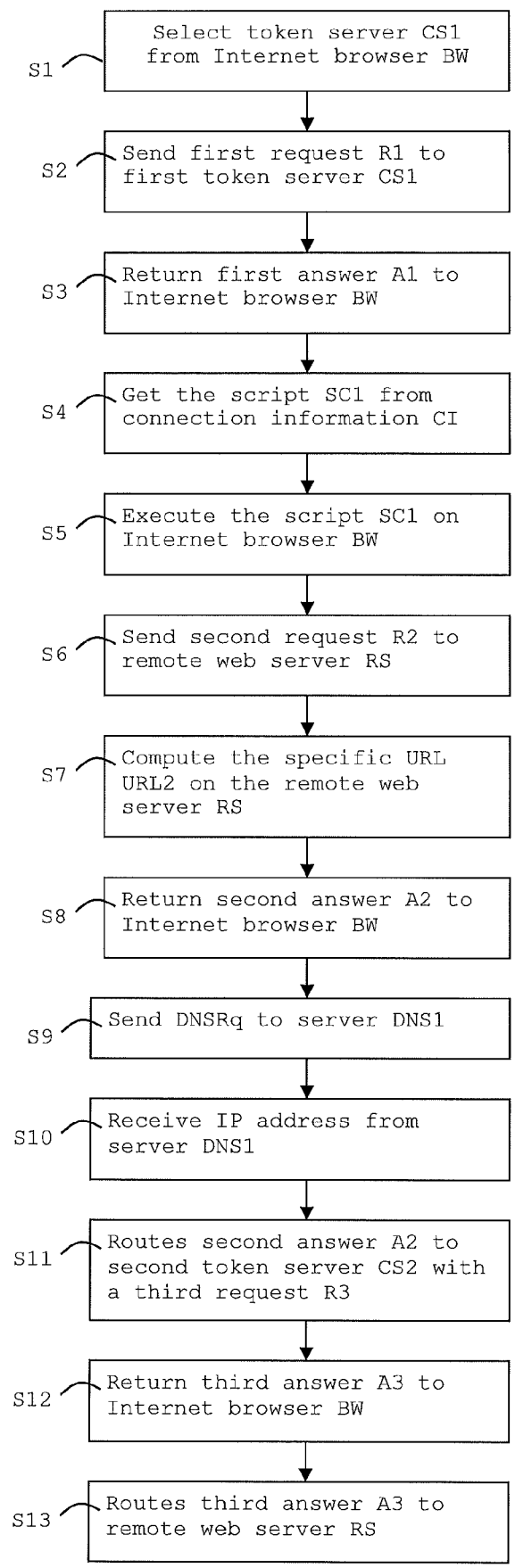
FIG. 3 is an example of sequence of steps for managing communication between an electronic token and a remote web server, according to the invention.

FIG. 3 shows an example of a step sequence for managing the connection and data exchanges between an electronic token and a remote web server. First a user launches the Internet web browser WB on the host machine HM. In step S1, the user selects the first token server CS1 by typing the corresponding address in the Internet web browser WB. For example, the address to be reached may be http://john.smith.secure or https://john.smith.secure. A first request R1 is then sent to the server CS1 of the connected electronic token ET at step S2. Then a first answer A1 is returned to the Internet web browser WB of the host machine HM at step S3. This first answer A1 contains a first HTML data D1 corresponding to a first HTML page. The first HTML data D1 contains a connection information CI and a second data D2. The second data D2 is related to the second token server CS2. The first HTML page is displayed by the Internet web browser WB. This first HTML page offers to connect the remote server RS. Then the user chooses connecting the remote server RS. This connection may be automatic through HTTP redirect or HTML automatic submission function. During step S4, the Internet web browser WB extracts a script SC1 from the previously received connection information CI. Then the Internet web browser WB executes the script SC1. The script execution sends a second request R2 to the remote server RS at step S6. This second request R2 contains the previously received second data D2. This second data D2 includes information identifying the server to be reached in the electronic token ET. At the step S7, the remote server RS computes a specific URL URL2 thanks to the second data D2. For example the second data D2 may contain the first part of the URL2 and the remote server RS may complete the computed specific URL by adding a complementary data specific to the token ET. Thus if the second data D2 provides "smartcard192_168_1_1" and the remote server RS adds "MyCompany.com" then the computed URL2 refers to "smartcard192_168_1_1.MyCompany.com". Then the computed URL2 may be resolved by DNS1 to the real IP address of the server CS2 in the token ET. For example, the real IP address of the server CS2 may be equal to 192.168.1.1.

Alternatively the computed URL2 may be resolved by the remote DNS2.

Then at step S8, the remote web server RS send a second answer A2 to the Internet web browser WB of the connected host machine HM. The second answer A2 contains third data D3 including the computed specific URL URL2.

The sending of the second answer A2 may be performed with a HTTP redirect function or with an HTML automatic submission function.

Alternatively, other functions of the Internet web browser may be embezzled as long as their use allows the automatic connection functions.

A remote URL URL1 is used for the second request R2. In a preferred embodiment, the remote URL URL1 belongs to the same domain as the computed specific URL URL2.

After receiving the second answer A2, the Internet web browser WB may send a request DNSRq to the domain name system DNS server DNS1 of the electronic token ET at step S9. This request DNSRq allows getting the IP address corresponding to the received URL2. Then, at step S10, the DNS1 server send back the IP address corresponding to URL2. This IP address corresponds to the second token server CS2.

Then the Internet web browser WB routes the second answer A2 to the second token server CS2 by sending a third request R3 to the token ET at step S11.

Figure 4:
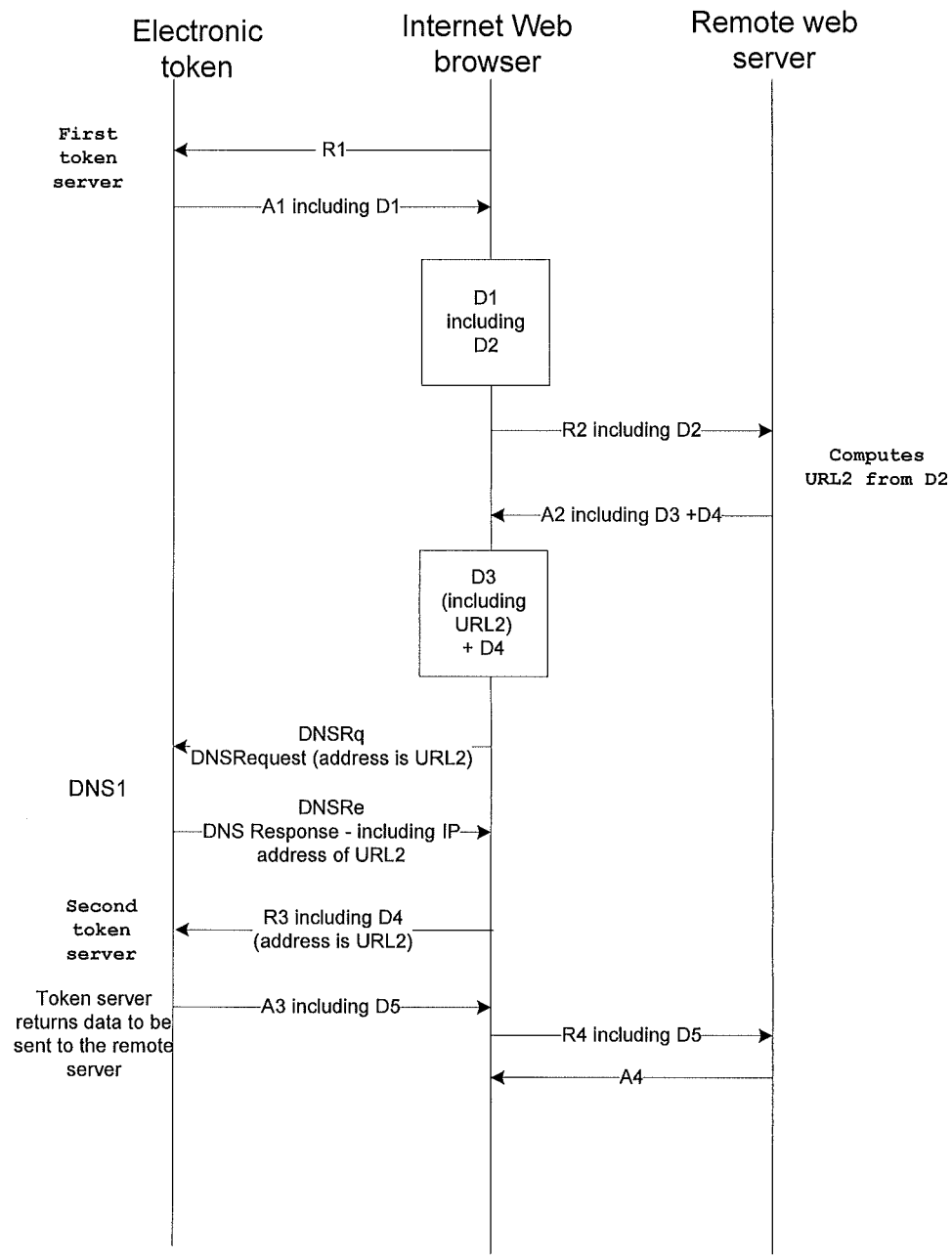
FIG. 4 is an example of data exchanges between an electronic token, a host machine and a remote web server, according to the invention.

Additionally and as shown in FIG. 4, the second answer A2 may contain a fourth data D4 intended to be used by the second token server CS2. In this case, the third request R3 contains the fourth data D4. For example, the fourth data D4 may be related to a new service available for the user. After reception of the third request R3, the first HTML data D1 may be updated in order to declare a new service according to the fourth data D4 content.

Alternately, a third answer A3 containing fifth data D5 may be sent to the Internet web browser WB by the second token server CS2 during step S12. This third answer A3 may be routed to the remote web server RS by the Internet web browser WB of the host machine HM.

Thus two connections are established on the Internet web browser WB: one to the remote web server RS and another to the second token server CS2 using URL2.

Advantageously, the first token server CS1 may be a HTTP server or a HTTPS server. The second token server CS2 may be a HTTP server or a HTTPS server Advantageously, first and second token servers CS1 and CS2 may be merged in a unique token server.

In the above example, the token ET comprises a virtual local network comprising a local domain name system DNS server DNS1. The invention also applies to electronic tokens ET not embedding a virtual local network.

Alternately, the Internet web browser WB may extracts a script URL URL3 from the received connection information CI during step S4. URL3 corresponds to an address where the script SC1 may be found. The script SC1 is then downloaded from URL3 and executed by the Internet web browser WB.

In a preferred embodiment the script SC1 is a javascript. The script SC1 may use the XMLHttpRequest API.

Advantageously, the second data D2 may comprise a variable part. The variable part may be randomly set or computed according to a predefined sequence. The variable part is made available for the DNS1.

An additional advantage of the invention is to secure the specific URL URL2 used for reaching the second token server CS2. The URL2 may change each time a connection to a remote web server RS is engaged. In all cases, both the remote web server RS and the DNS1 dynamically calculates URL2 from the same information.

Alternately a second domain name system DNS server DNS2 may be reachable from the host machine HM. When the sending of the second answer A2 is performed with a HTTP redirect function, DNS2 may be used if the electronic token has no DNS1. Moreover, DNS2 may be used if the electronic token is not an IP token and is accessed via a software proxy localized on the connected host machine HM. In such a case, the first request R1 may be addressed to the host machine address such as http://127.0.0.1:4116 instead of http://john.smith.secure and URL2 refers to name like "smartcard.MyCompagny.com" that is resolved to "127.0.0.1" by remote DNS2.

The invention claimed is:

1. A method of managing communication between an electronic token and a remote web server, said electronic token being connected to a host machine and comprising a microprocessor, a communication interface and a memory comprising an operating system and at least a first HTML data, said electronic token comprising at least first and second token servers, said remote web server being connected to the host machine, said host machine having an Internet web browser, said method comprising the following steps:

sending a first request from the Internet web browser of the host machine to the first token server of the electronic token;

returning a first answer from the first token server to the Internet web browser, said first answer comprising a first HTML data including connection information associated with a script, wherein the first HTML data comprises second data;

on the Internet web browser, executing the script associated with the connection information;

wherein execution of said script establishes a connection to the remote web server allowing a two-way communication between the second token server of the electronic token and the remote web server through the Internet web browser of the host machine acting as a gateway;

sending a second request from the Internet web browser to the remote web server, wherein said second request comprises the second data;

on the remote web server, computing a specific URL based on the second data, said specific URL providing a connection to the second token server;

returning a second answer from the remote web server to the Internet web browser, said second answer including a third data comprising the specific URL; and on the Internet web browser, routing said second answer received from the remote web server with a third request to the second token server.

2. A method according to claim 1, wherein the step of returning the second answer is performed by a HTTP redirect function or by an HTML automatic submission function.

3. A method according to claim 1, wherein the electronic token comprises a virtual local network comprising a local domain name server, and wherein said method further comprises the steps of:

sending a DNS request from the Internet web browser to the local domain name server, said DNS request comprising the specific URL; and receiving a DNS answer comprising an IP address corresponding to the specific URL sent to the Internet web browser by the local domain name system DNS server.

4. A method according to claim 1, wherein said second answer comprises a fourth data, and wherein said third request comprises the fourth data.

5. A method according to claim 1, wherein said method further comprises the steps of:

in response to the third request, sending a third answer from the second token server to the Internet web browser, said third answer comprising a fifth data; and routing said fifth data from the Internet web browser to the remote web server.

6. A method according to claim 1, wherein said second data comprises a variable part, said variable part being randomly set or computed according to a predefined sequence.

7. A method according to claim 1, wherein each of said first and second token servers is a HTTP server or a HTTPS server.

8. A method according to claim 1, wherein said first and second token servers are merged in a single token server.

9. A method according to claim 1, wherein said connection information comprises the script, or a script URL from where the script may be downloaded.

10. A method according to claim 1, wherein said script is a javascript.

11. An electronic token intended to be connected to a host machine, said electronic token comprising:

a microprocessor;

a communication interface;

a memory comprising an operating system and at least a first HTML data, wherein the first HTML data comprises second data;

at least first and second token servers, wherein said host machine has an Internet web browser and is configured to be connected to a remote web server, the first HTML data comprises connection information associated with a script, said connection information is intended to be sent by the first token server of the electronic token, execution of said script by the Internet web browser of the host machine establishes a connection to the remote web server allowing a two-way communication between the second token server of the electronic token and the remote web server through the Internet web browser of the host machine acting as a gateway, a request is sent from the Internet web browser to the remote web server, and said request comprises the second data, on the remote web server, a specific URL is computed based on the second data, said specific URL providing a connection to the second token server, an answer is returned from the remote web server to the Internet web browser, said answer including a third data comprising the specific URL, and on the Internet web browser, said answer received from the remote web server is routed with a second request to the second token server.

12. An electronic token according to claim 11, wherein said token is a smart card, a portable audio device, a mobile handset, a personal digital assistant or a USB token.

* * * * *